(12) United States Patent
Matsuoka

(10) Patent No.: US 8,291,578 B2
(45) Date of Patent: Oct. 23, 2012

(54) APPARATUS FOR CUTTING BRAID OF SHIELDED CABLE

(75) Inventor: Masaki Matsuoka, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 2115 days.

(21) Appl. No.: 11/056,294

(22) Filed: Feb. 14, 2005

(65) Prior Publication Data

US 2005/0181672 A1 Aug. 18, 2005

(30) Foreign Application Priority Data

Feb. 16, 2004 (JP) ................................ P2004-038163

(51) Int. Cl.
*B23P 19/00* (2006.01)

(52) U.S. Cl. ............. 29/748; 29/745; 29/564.4; 29/33 F; 29/828

(58) Field of Classification Search ............ 29/745–748, 29/828, 825, 1–566.4, 33 M, 33 F; 140/71 R, 140/102–105, 107; 72/416, 470, 327
See application file for complete search history.

(56) References Cited

U.S. PATENT DOCUMENTS

| | | | | |
|---|---|---|---|---|
| 4,802,512 A | * | 2/1989 | Kodera | 140/149 |
| 4,873,901 A | * | 10/1989 | Stoehr | 81/9.51 |
| 5,058,260 A | * | 10/1991 | Gloe et al. | 29/564.4 |
| 5,067,379 A | * | 11/1991 | Butler et al. | 83/13 |
| 5,138,910 A | * | 8/1992 | Ishikawa et al. | 81/9.51 |
| 6,243,947 B1 | * | 6/2001 | Fujita et al. | 29/867 |
| 6,363,604 B1 | | 4/2002 | Sakuma | |
| 6,659,140 B2 | * | 12/2003 | Yamakawa | 140/71 R |

FOREIGN PATENT DOCUMENTS

| | | |
|---|---|---|
| JP | 52-124186 | 10/1977 |
| JP | 06-335131 A | 12/1994 |
| JP | 11-150825 A | 6/1999 |
| JP | 2001-327027 A | 11/2001 |
| JP | 2001-357960 A | 12/2001 |

\* cited by examiner

Primary Examiner — Minh Trinh
(74) Attorney, Agent, or Firm — Sughrue Mion, PLLC

(57) ABSTRACT

In a shielded cable braid-cutting apparatus 10, a pair of braid-spreading claws 32 and 33 beat an outer periphery of a braid 44 to spread the braid 44 into a larger diameter, and then the braid 44 is cut. In the shielded cable braid-cutting apparatus 10, each of the pair of braid-spreading claws 32 and 33 has a recess portion 74 of a generally recumbent V-shape, and the braid-spreading claws 32 and 33 are slid radially of the braid 44 so as to cause the recess portions 74 of the braid-spreading claws 32 and 33 to beat four portions 44A of the outer periphery of the braid 44, thereby spreading the braid 44 into a larger diameter.

6 Claims, 4 Drawing Sheets

APPARATUS FOR CUTTING BRAID OF SHIELDED CABLE

BACKGROUND OF THE INVENTION

Field of the Invention

This invention relates to an apparatus for cutting a braid of a shielded cable, and for example to a shielded cable braid-cutting apparatus for cutting a braid exposed at an end portion of the shielded cable.

A conventional shielded cable braid-cutting apparatus for cutting an end portion of a braid of a shielded cable is shown in, for example, Japanese Patent Publication 2001-327027.

For cutting a distal end portion of a braid of the shielded cable by this shielded cable braid-cutting apparatus, first, a pair of braid-spreading claws are located at a predetermined position by a feed mechanism, and then the distal end of the braid of the shielded cable is brought into abutting engagement with the braid-spreading claws, thereby locating the cable at a cutting position.

The positioned cable is held by a chuck, and then the pair of braid-spreading claws, while moved in a longitudinal direction of the braid by the feed mechanism, are revolved around the distal end portion of the braid by a rotation drive mechanism to beat the outer periphery of the distal end portion of the braid, thereby spreading the distal end portion of the braid into a larger diameter.

A distal end portion of a braid-floating pipe is inserted into the braid having the spread distal end, so that an inner blade, provided at the distal end of the braid-floating pipe, is located within the braid.

An outer blade, located around the outer periphery of the braid, is moved toward the distal end of the braid, so that the braid is cut in a shearing manner by the outer and inner blades.

However, the conventional shielded cable braid-cutting apparatus must include the rotation drive mechanism for revolving the pair of braid-spreading claws around the distal end portion of the braid so as to spread the distal end portion of the braid into a larger diameter, and this apparatus must further include the feed mechanism for moving the pair of braid-spreading claws in the longitudinal direction of the braid.

Thus, the conventional shielded cable braid-cutting apparatus is provided with the two mechanisms, that is, the rotation drive mechanism and the feed mechanism, and therefore its structure is large.

SUMMARY OF THE INVENTION

This invention has been made in view of the above problem, and an object of the invention is to provide a shielded cable braid-cutting apparatus which is simplified in construction so as to achieve a compact structure of a facility.

1) The above object has been achieved by a shielded cable braid-cutting apparatus of the present invention wherein a pair of braid-spreading claws are moved to be disposed around an outer periphery of a braid of a shielded cable, and the pair of braid-spreading claws, while moved in a longitudinal direction of the shielded cable, are slid radially of the braid to beat the outer periphery of the braid, thereby spreading the braid into a larger diameter, and a punch is inserted into the spread braid, and is moved toward a die so as to cut the braid by the die and the punch; provided in that each of the pair of braid-spreading claws has a recess portion of a generally recumbent V-shape, and the braid-spreading claws are slid radially of the braid so as to cause the recess portions of the braid-spreading claws to beat four portions of the outer periphery of the braid, thereby spreading the braid into a larger diameter.

In the shielded cable braid-cutting apparatus of this construction, the pair of braid-spreading claws have the recess portions of a generally recumbent V-shape, respectively, and the four portions of the outer periphery of the braid are beaten by these recess portions, and with this construction it is not necessary to revolve the pair of braid-spreading claws around the braid. Therefore, it is not necessary to provide, for example, a rotation drive mechanism (as required in the conventional construction) for revolving the pair of braid-spreading claws.

Therefore, the shielded cable braid-cutting apparatus can be simplified in construction, and this solves a problem that the structure of the facility is increased.

2) The apparatus of the invention is also provided in that there is provided a feed mechanism for moving the pair of braid-spreading claws in the longitudinal direction of the shielded cable to position the pair of braid-spreading claws, and the feed mechanism also serves to move the pair of braid-spreading claws in the longitudinal direction of the shielded cable while the pair of braid-spreading claws beat the outer periphery of the braid.

In the shielded cable braid-cutting apparatus of this construction, the feed mechanism serves to position the pair of braid-spreading claws, and also serves to move the pair of braid-spreading claws in the longitudinal direction of the shielded cable while the pair of braid-spreading claws beat the braid.

Therefore, the shielded cable braid-cutting apparatus can be simplified in construction, and this solves a problem that the structure of the facility is increased.

3) The apparatus of the invention is further provided in that the pair of braid-spreading claws can be slid by a slide member, connected to the braid-spreading claws, and a cylinder having a piston rod threadedly connected to the slide member, and an amount of overlapping of the pair of braid-spreading claws can be adjusted by changing a length of threaded engagement between the piston rod and the slide member.

In the shielded cable braid-cutting apparatus of this construction, by adjusting the amount of overlapping of the pair of braid-spreading claws, the apparatus can process shielded cables of various sizes, and therefore the operation rate of the facility can be further increased.

4) The apparatus of the invention is further provided in that the pair of braid-spreading claws have the same shape, and are disposed bilaterally symmetrically.

It is necessary to insert the punch into the braid after the braid is spread into a larger diameter, and therefore it is necessary to bring the axis of the braid into agreement with the axis of the shielded cable.

Therefore, in the shielded cable braid-cutting apparatus, the pair of braid-spreading claws have the same shape, and are disposed bilaterally symmetrically, and with this construction the pair of braid-spreading claws can beat the bilaterally symmetrically-disposed portions of the outer periphery of the braid.

Therefore, when the pair of braid-spreading claws beat the outer periphery of the braid, the braid is aligned, so that the alignment of the shielded cable can be effected concurrently with the braid-spreading operation.

The present invention solves a problem that the structure of the facility increases as in the conventional construction, and therefore there is achieved an advantage that a compact structure of the facility can be achieved by providing the simplified construction.

DETAILED DESCRIPTION OF THE PREFERRED EMBODIMENTS

Figure 1:
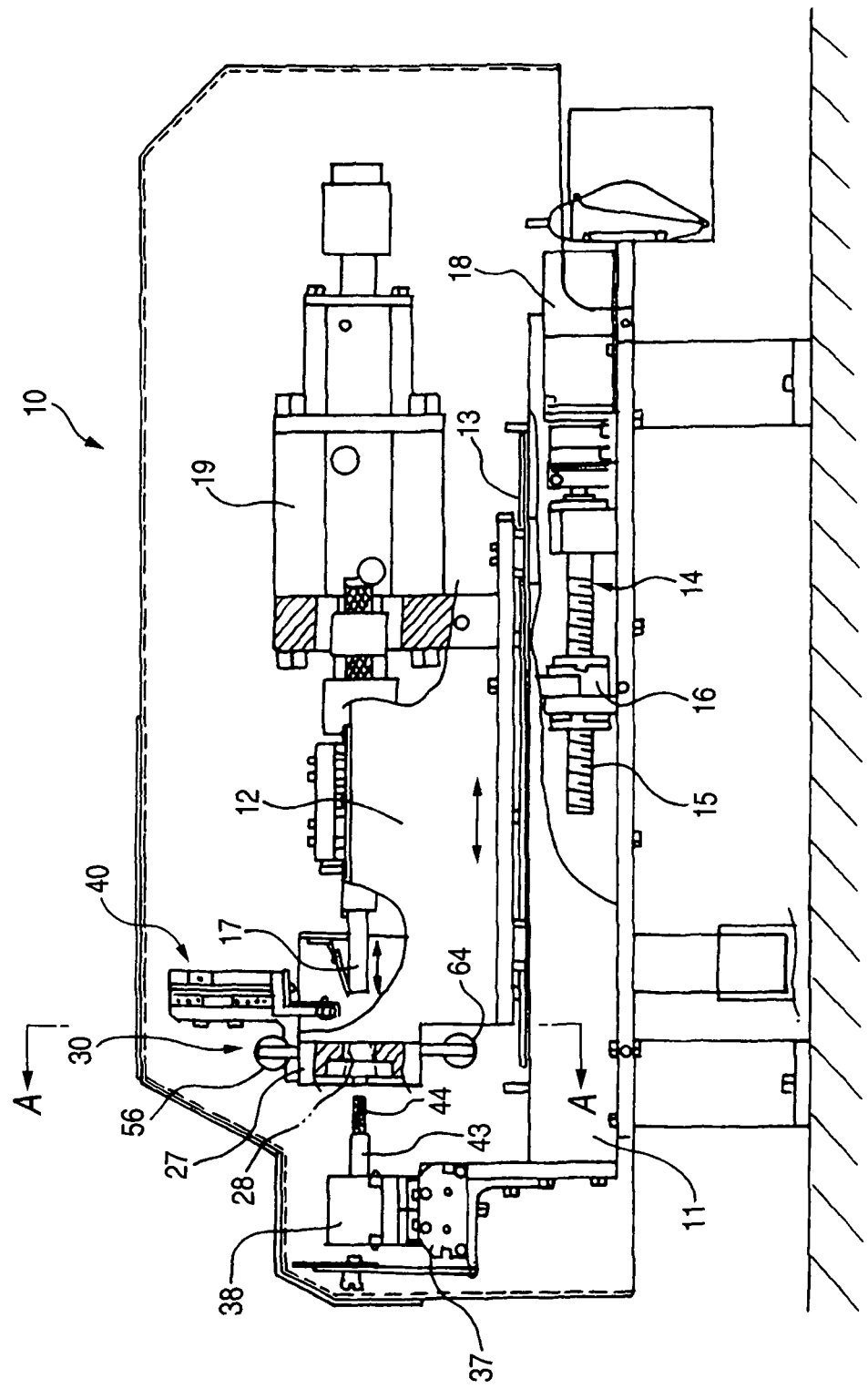
FIG. 1 is a side-elevational view of a shielded cable braid-cutting apparatus of the invention.
Figure 2:
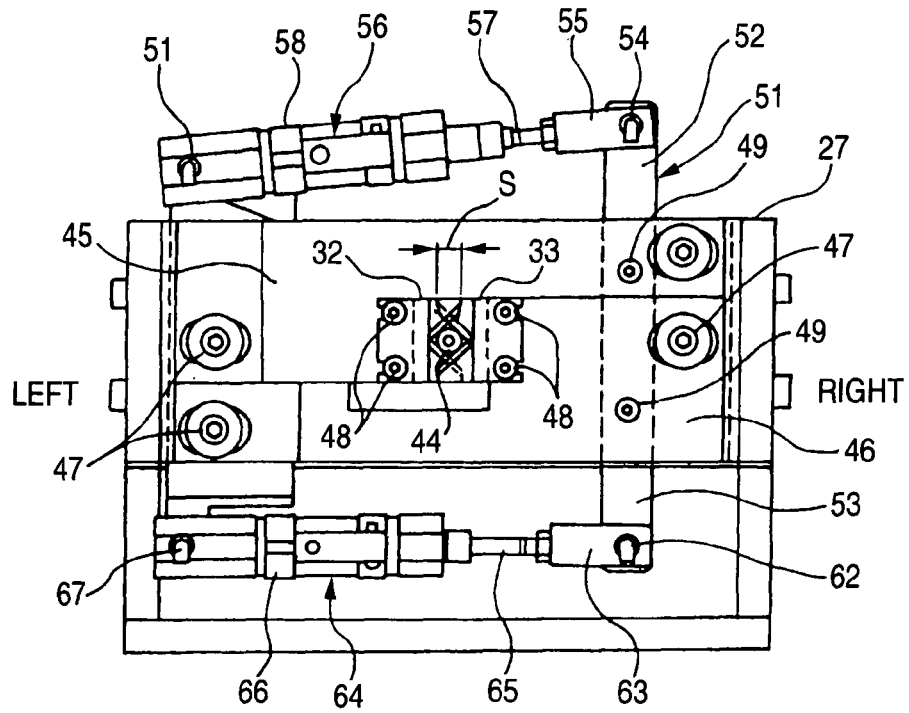
FIG. 2 is a front-elevational, cross-sectional view of the shielded cable braid-cutting apparatus of the invention taken along the line A-A of FIG. 1.
Figure 3:
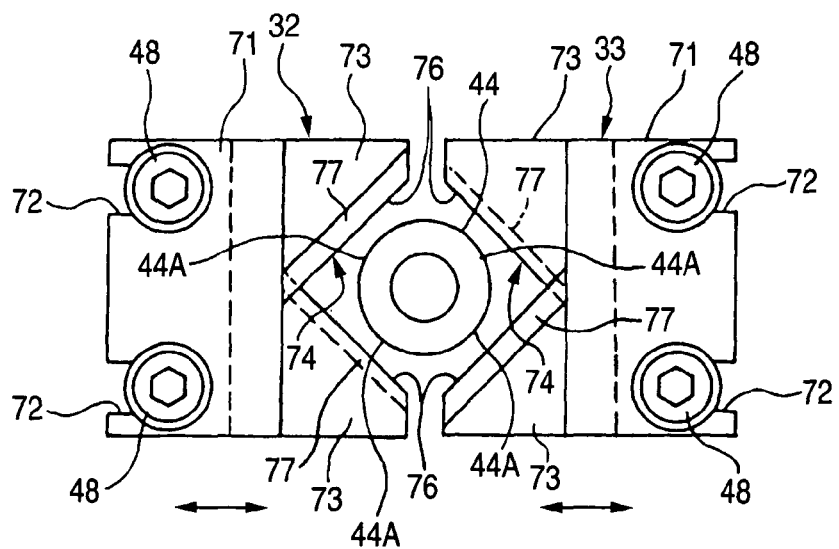
FIG. 3 is a front-elevational view showing left and right braid-spreading claws of the shielded cable braid-cutting apparatus of the invention.
Figure 4:
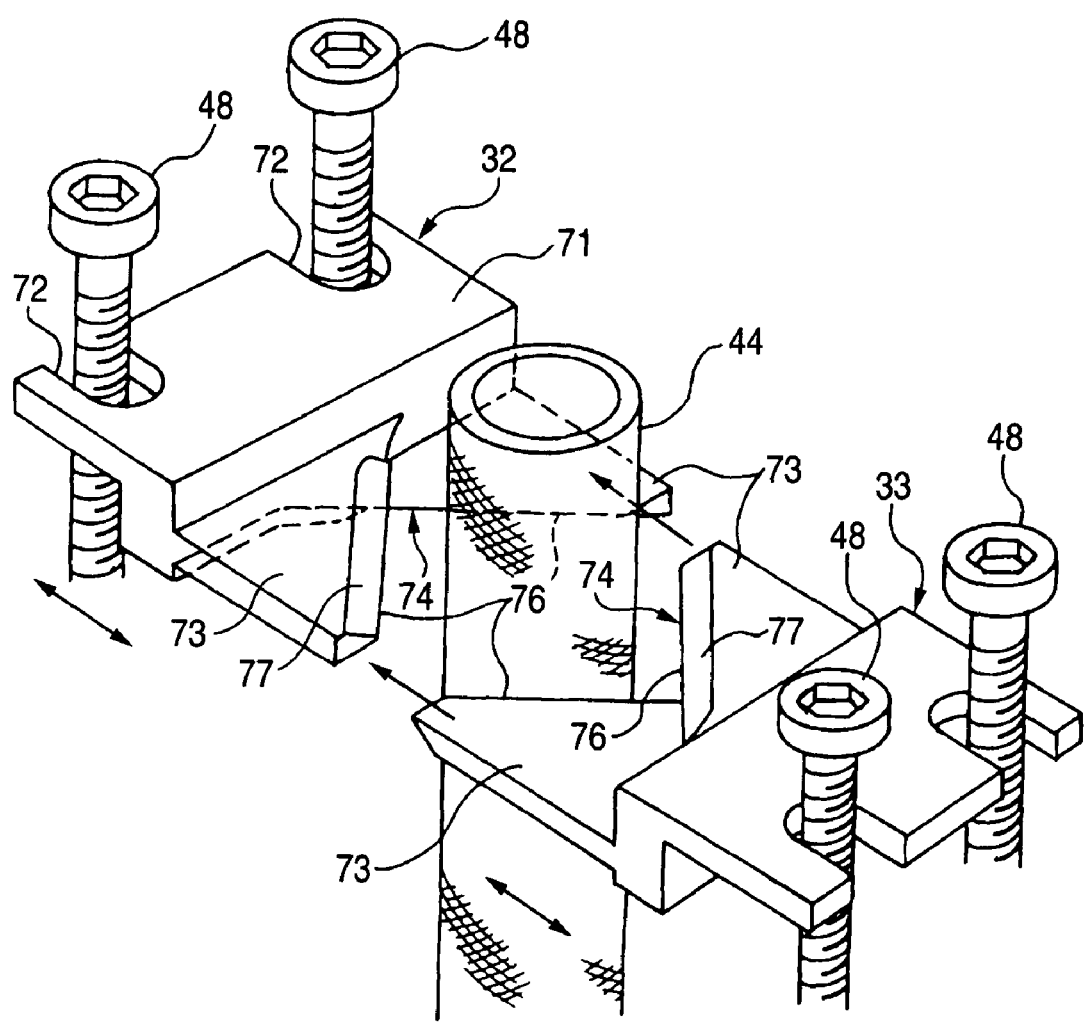
FIG. 4 is a perspective view showing the left and right braid-spreading claws of the shielded cable braid-cutting apparatus of the invention.

A preferred embodiment of the present invention will now be described in detail with reference to the drawings. FIG. 1 is a side-elevational view of a shielded cable braid-cutting apparatus of the invention, FIG. 2 is a front-elevational view of the shielded cable braid-cutting apparatus of the invention, FIG. 3 is a front-elevational view showing left and right braid-spreading claws of the shielded cable braid-cutting apparatus of the invention, and FIG. 4 is a perspective view showing the left and right braid-spreading claws of the shielded cable braid-cutting apparatus of the invention.

As shown in FIG. 1, the shielded cable braid-cutting apparatus 10, embodying the invention, includes a slide base 12 slidably mounted on a bed 11 through guide rails 13, and a feed mechanism 14 provided below the slide base 12.

For example, the feed mechanism 14 comprises a ball screw 15, and a moving member 16 which is threaded on the ball screw 15, and is connected to the slide base 12, and a drive portion 18 for rotating the ball screw 15.

A die 28, braid-spreading means 30 and positioning means 40 are provided at a front portion of the slide base 12. The braid-spreading means 30 will be described later in detail with reference to FIG. 2. The left braid-spreading claw 32 and right braid-spreading claw 33 of the braid-spreading means 30 are shown in FIG. 2.

When the drive portion 18 of the feed mechanism 14 is driven, the ball screw 15 is rotated to move the moving member 16 forward and backward.

When the slide base 12, together with the moving member 16, is moved forward and backward (that is, in directions of arrows), the pair of claws (left and right claws) 32 and 33 (see FIG. 2) of the braid-spreading means 30 are moved forward and backward. By doing so, the die 28, the braid-spreading means 30 and the positioning means 40 can be located at their respective predetermined positions. The positioning means 40 has a plate-like shape, and is brought into abutting engagement with an end surface of a shielded cable to position this shielded cable, and this positioning means 40 can be moved upward and downward radially of the shielded cable.

Although as one example, the feed means 14 comprises the ball screw 15, and the drive portion 18 for rotating the ball screw 15, the feed means is not limited to this construction.

A punch-operating portion 19 is provided on the slide base 12, and a punch 17 is mounted on this punch-operating portion 19.

When the punch-operating portion 19 is operated, the punch 17 is moved forward and backward (in directions of arrows).

In the shielded cable braid-cutting apparatus 10, a chuck 38 is mounted on the bed 11 through a support member 37. The chuck 38 serves to grasp the shielded cable 43.

As shown in FIG. 2, in the braid-spreading means 30, left and right slide plates 45 and 46 are mounted by bolts 47 on a frame 27 so as to slide left and right, and the left braid-spreading claw 32 is mounted on the left slide plate 45 by bolts 48, while the right braid-spreading claw 33 is mounted on the right slide plate 46 by bolts 48. A link 51 is connected to the left and right slide plates 45 and 46 through bolts 49, and an upper interconnecting member 55 is connected to an upper end portion 52 of the link 51 through a bolt 54. A piston rod 57 of an upper cylinder 56 (see also FIG. 1) is threadedly connected at its distal end to the upper interconnecting member 55, and a cylinder portion 58 of the upper cylinder 56 is connected to an upper portion of the frame 27 through a bolt 61. A lower interconnecting member 63 is connected to a lower end portion 53 of the link 51 through a bolt 62, and a piston rod 65 of a lower cylinder 64 is threadedly connected at its distal end to the lower interconnecting member 63. A cylinder portion 66 of the lower cylinder 64 (see also FIG. 1) is connected to a lower portion of the frame 27 through a bolt 67.

Overlapping portions (distal end portions) of the left and right braid-spreading claws 32 and 33 overlap each other in an amount of S, and by changing the length of this overlapping region S, the apparatus can process shielded cables 43 of different outer diameters.

As shown in FIGS. 3 and 4, the left braid-spreading claw 32 includes a base portion 71 having insertion grooves 72 each for receiving the bolt 48, and a pair of overlapping slanting claws 73 are formed on the base portion 71, so that a recess portion 74 of a generally recumbent V-shaped is defined by abutment sides 76 of the slanting claws 73.

The abutment sides 76 of the pair of slanting claws 73 serve to beat the outer periphery of a braid 44, and a slanting surface 77 is formed on each of the abutment sides 76, thereby reducing the thickness of the abutment side 76.

By reducing the thickness of each of the abutment sides 76, the abutment sides 76 can beat the outer periphery of the braid 44 effectively.

The right braid-spreading claw 33 is identical in construction to the left braid-spreading claw 32, and therefore corresponding portions thereof are designated by identical reference numerals, respectively, and explanation thereof will be omitted.

Thus, the left and right braid-spreading claws 32 and 33 have the same shape, and are disposed symmetrically bilaterally (right and left). With this construction, when the left and right braid-spreading claws 32 and 33 are slid radially of the braid 44, the recess portions 74 of the braid-spreading claws 32 and 33 beat four points (or portions) 44A on the outer periphery of the braid 44, thereby spreading the braid 44 into a larger diameter.

Here, the left and right braid-spreading claws 32 and 33 have the same shape, and are disposed symmetrically bilaterally (right and left), and with this construction the left and right braid-spreading claws 32 and 33 can beat the bilaterally symmetrically-disposed portions 44A of the outer periphery of the braid 44.

The left and right braid-spreading claws 32 and 33 thus beat the outer periphery of the braid 44, and this operation also serves to align the braid 44. Therefore, the alignment of the shielded cable 43 can be achieved concurrently with the braid-spreading operation.

Next, the operation of the shielded cable braid-cutting apparatus 10 will be described with reference to FIGS. 5A to 5D.

Figure 5:
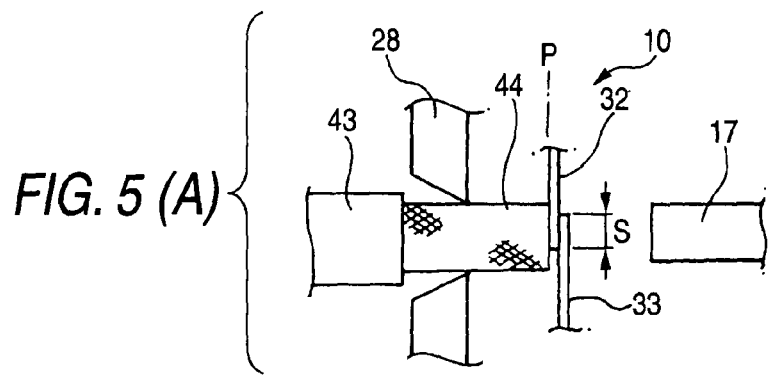
FIGS. 5A to 5D are views explanatory of the operation of the shielded cable braid-cutting apparatus of the invention.
Figure 5:
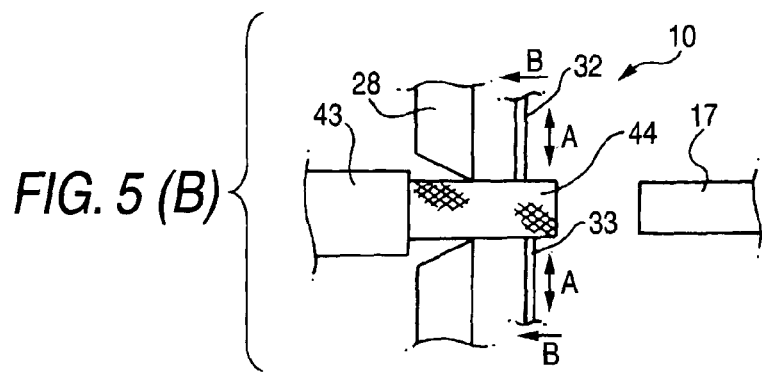
Figure 5:
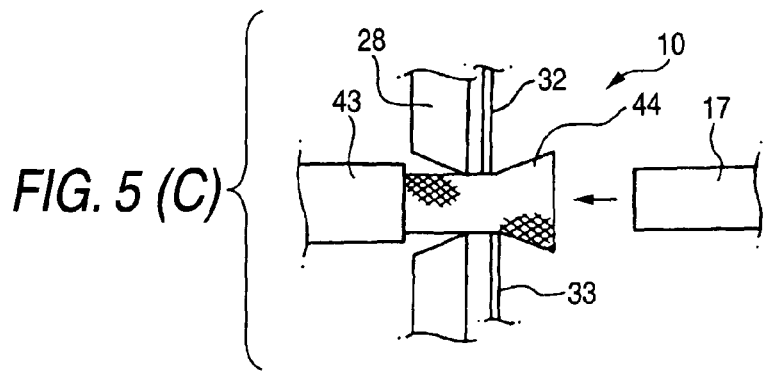
Figure 5:
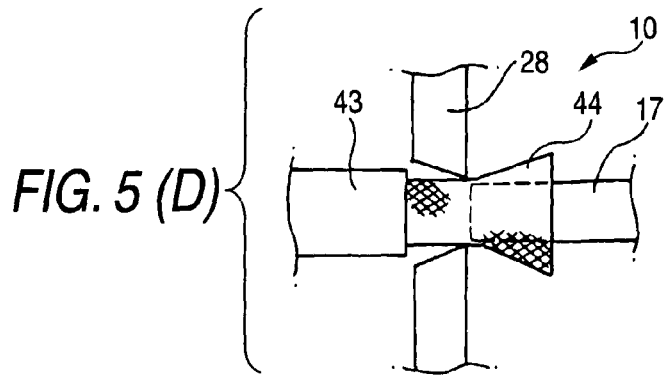

After the positioning means 40 is moved downward, the shielded cable 43 is moved in its axial direction, so that the distal end of the shielded cable 43 is brought into abutting engagement with the positioning means 40 to be located at a cutting position P as shown in FIG. 5A.

The thus positioned shielded cable 43 is grasped by the chuck 38 (see FIG. 1), and then the positioning means 40 is moved upward into a retracted position.

Then, the left and right braid-spreading claws 32 and 33 are slid outwardly to reduce the overlapping region S (see FIG. 2) or to eliminate the overlapping region S as shown in FIG. 3, and in this condition the left and right braid-spreading claws 32 and 33 are located around that portion of the braid 44 disposed near to the distal end of this braid 44, as shown in FIG. 5B.

In this condition, the left and right braid-spreading claws 32 and 33, while moved in the longitudinal direction (that is, in a direction of arrow B) of the shielded cable 43, are slid radially of the braid 44 (that is, in directions of arrows A) so as to cause the recess portions 74 (see FIGS. 3 and 4) of the left and right braid-spreading claws 32 and 33 to beat the four portions (points) 44A (see FIG. 3) of the outer periphery of the braid 44, thereby spreading the distal end of the braid 44 into a larger diameter.

Thus, the left and right braid-spreading claws 32 and 33 have the recess portions 74 of a generally recumbent V-shape, respectively, and the four portions 44A of the outer periphery of the braid 44 are beaten by these recess portions 74, and with this construction it is not necessary to revolve the left and right braid-spreading claws 32 and 33 around the braid 44. Therefore, it is not necessary to provide a rotation drive mechanism for revolving the left and right braid-spreading claws 32 and 33.

The four portions 44A of the outer periphery of the braid 44 are thus beaten, so that the distal end of the braid 44 is spread into a larger diameter, and in this condition the punch 17 is inserted into the braid 44 having the spread distal end, as shown in FIG. 5C.

As shown in FIGS. 3 and 4, the left and right braid-spreading claws 32 and 33 have the same shape, and are disposed symmetrically bilaterally (right and left), and the left and right braid-spreading claws 32 and 33 beat the bilaterally symmetrically-disposed portions 44A (see FIG. 3) of the outer periphery of the braid 44, so that the operation for aligning the braid 44 is effected. Therefore, the alignment of the shielded cable 43 can be effected concurrently with the braid-spreading operation.

Therefore, the punch 17 can be accurately inserted into the braid 44 having the spread distal end.

By thus inserting the punch 17 into the braid 44 having the spread distal end, the braid 44 is cut by the punch 17 and the die 28 as shown in FIG. 5D.

The invention is not limited to the shielded cable braid-cutting apparatus 10 of the above embodiment, and suitable modifications, improvement and so on can be made.

The material, shape, dimensions, form, number, disposition, etc., of each of the punch 17, die 28, feed mechanism 14, the left and right braid-spreading claws 32 and 33, braid 44, link 51, upper and lower cylinders 56 and 64, the recess portions 74 and so on are arbitrary, and are not limited in so far as the invention can be achieved.

What is claimed is:

1. Apparatus for cutting a braid of a shielded cable comprising:
   a slide base slidably mounted on a bed through guide rails, the slide base having a punch through a punch-operating portion;
   a feed mechanism provided on the bed;
   a chuck, mounted on the bed through a support member, for holding a shielded cable;
   a die and a positioning unit provided at a front portion of the slide base in a longitudinal direction of the slide base;
   a braid-spreading unit positioned between the die and the positioning unit and slidably moving in a longitudinal direction of a shield cable, the braid-spreading unit having a pair of braid-spreading claws, each of said pair of braid-spreading claws having a recess portion in V-shape and sliding in a radial direction of the shield cable.

2. The shielded cable braid-cutting apparatus according to claim 1, further comprising:
   link mechanism, for sliding pair of said braid-spreading claws, connected to said braid-spreading claws;
   a cylinder having a piston rod threadedly connected to the link, and an amount of overlapping of said pair of braid-spreading claws adjusted by changing a length of threaded engagement between said piston rod and said link.

3. The shielded cable braid-cutting apparatus according to claimed in claim 1, wherein said pair of braid-spreading claws have the same shape, and are disposed bilaterally symmetrically.

4. The shielded cable braid-cutting apparatus according to claim 1, wherein the braid-spreading unit spreads a distal end of a braid of the shield cable to a larger diameter.

5. The shielded cable braid-cutting apparatus according to claim 4, wherein the punch and the die cut the braid by inserting the punch into the spread distal end of the braid.

6. The shielded cable braid-cutting apparatus according to claim 1, wherein the braid-spreading unit is disposed between the die and the punch with respect to the longitudinal direction of the shield cable.

* * * * *